United States Patent [19]

Sommer

[11] 3,755,334

[45] Aug. 28, 1973

[54] NEW QUATERNIZATION METHOD

[76] Inventor: Harold Z. Sommer, 610 Lafayette St., Havre de Grace, Md. 21078

[22] Filed: June 26, 1970

[21] Appl. No.: 50,352

[52] U.S. Cl...... 260/293.51, 260/343.6, 260/518 R, 260/567.6 M
[51] Int. Cl............................................ C07d 29/12
[58] Field of Search.................... 260/293.51, 343.6, 260/518 R, 567.6 M

[56] References Cited
OTHER PUBLICATIONS

Houben–Weyl, "Methoden Der Organischen Chemie, Stickstoff–verbindung," Vol. XI/2, Georg Thieme Verlag, Stuttgart, Germany (1958), pp. 597 and 603.

*Primary Examiner*—Henry R. Jiles
*Assistant Examiner*—G. Thomas Todd

[57] ABSTRACT

A method for the synthesis of quaternary ammonium compounds and tertiary amines from primary and secondary amines with an alkylating agent and an organic base.

9 Claims, No Drawings

NEW QUATERNIZATION METHOD

My invention relates to a new method for the synthesis of quaternary ammonium compounds and tertiary amines from primary and secondary amines.

Since quaternary ammonium compounds and tertiary amines have considerable utility as intermediates, detergents, insecticides, bacteriostats, and drugs; it is imperative that processes be developed which are economical to operate and produce good yields with minimal manipulation and effort.

The prior art method for direct exhaustive alkylation of primary and secondary amines to the quaternary stage required harsh reaction conditions and gave rise to undesirable side reactions. As a result of the aforementioned harsh reaction conditions and resulting undesirable side reactions, the prior art process was limited to utilizing stable amine and alkylating agent reactants to carry out the process. The general prior art procedure for the direct alkylation of primary or secondary amines to their quaternary ammonium salts involved refluxing a mixture of an amine, an alkyl halide, an inorganic base, such as sodium hydroxide or sodium carbonate, and a liquid vehicle, such as water or alcohol. See, for example, J. Goerdeler, "Methoden Der Organishen Chemie, Stickstoffverbingdungen," (Houben-Weyl), Eugen Muller, Ed. Vol. XI 2, Georg Thieme Verlag, Stuttgart Germany, 1958, pp 587–640. This procedure required prolonged heating of heterogenous and strongly basic reaction mixtures resulting in undesirable side reactions and consequent low yields. Accordingly, the prior art method is of value only when both the amine and alkylating reactants are thermally stable and insensitive to strong inorganic bases. Further, the purification of quaternary compounds in the presence of inorganic salts by the aforementioned prior art technique was laborious and time consuming, because the solubilities of the inorganic salts and the quaternary compounds in most common solvents are very similar. In view of the aforementioned prior art problems, the route of choice for the preparation of quaternary ammonium compounds is the synthesis and isolation of the appropriate tertiary amine prior to subsequent quaternization. However, the tertiary amine route is not satisfactory due to the additional steps required which render the process laborious and time consuming. My invention was conceived and reduced to practice to overcome the aforementioned prior art problems and to satisfy the long felt need for a process for the synthesis of quaternary ammonium compounds by the direct alkylation of primary and secondary amines through the application of mild and homogenous reaction conditions.

The principal object of my invention is to provide a reliable and effective method for the synthesis of quaternary ammonium compounds and tertiary amines by the direct alkylation of primary and secondary amines.

Another object of my invention is to provide a method for the synthesis of quaternary ammonium compounds and tertiary amines by the direct alkylation of primary and secondary amines which results in good yields and eliminates undesirable side reactions.

A further object of my invention is to provide a method for the synthesis of quaternary ammonium compounds by the direct alkylation of primary and secondary amines which eliminates the additional steps required by the isolated tertiary amine route and does not require laborious and time consuming purification steps.

A still further object of my invention is to provide a method for the synthesis of quaternary ammonium compounds and tertiary amines by the direct alkylation of primary and secondary amines which does not limit the amines and alkylating agents to those which are thermally stable and insensitive to strong inorganic bases.

Other objects of my invention will be obvious or will appear from the specification hereinafter set forth.

I unexpectedly discovered that the addition of a sterically hindered organic base of greater base strength than the reactant primary or secondary amine to the solution of a primary or secondary amine or a material in the form of an amine acid salt and an alkylating agent results in the production of a quaternary ammonium compound or tertiary amine in good yield after the reaction solution reacts and the product is separated from the reaction solution by any conventional means such as filtration, distillation, centrifugation, chromatography, extraction, decantation, recrystallization, evaporation, separation by solubility difference, or any combination of any conventional means. The filtration mode is preferred because the product in many instances can be separated from the reaction by mere filtration after the reaction solution stands at room temperature for a predetermined time; the product precipitating and the protonated organic base remaining in solution through the selection of a solvent in which the product is insoluble and the protonated organic base is soluble or vice versa. Optimal mild conditions in the utilization of my invention can be obtained by selecting a sterically hindered organic base having only slightly greater basicity than the amine to be alkylated. Gradual addition of the base renders the reaction conditions even milder.

My discovery was unexpected, because the addition of a strong organic base to a primary or secondary amine results in the strong base being preferentially alkylated whereas my utilization of a sterically hindered organic base having greater basicity than the amine to be alkylated results in the amine to be alkylated being driven to exhaustive alkylation and the organic base being protonated and not being alkylated in any significant amount. My unexpected discovery is dramatically demonstrated by subsequently described Example III which illustrates the underlying principle upon which my new exhaustive alkylation method is based; the example showing that m-Nitroaniline (pKa equals 2.6) was preferentially and completely methylated in 86 percent yield in the presence of 1,2,2,6,6-pentamethylpiperidine (pKa equals 11.25) which is about $10^9$ times greater in base strength than m-nitroaniline, while no quaternized product of 1,2,2,6,6-pentamethylpiperidine was detected. My process is operable because the organic base acts as the proton acceptor to bind the acid generated in the alkylation reactions and enables complete alkylation of primary and secondary amines under mild and homogenous reaction conditions to produce good yields with minimal manipulations and effort.

EXAMPLE I

A solution of 3.0 gm of m-(trifluoromethyl)-aniline, 6.6 gm of di-n-propylaniline, and 14.2 gm of methyl iodide in 15 ml of N,N-dimethylformamide was kept at room temperature overnight. The precipitated product was then collected on a filter medium, washed with acetone, then washed with ether, and dried to give 5.2 gm (84 percent yield) of compound VIII in Table I as colorless crystals; mp 242°–243° C.

Anal. Calculated for $C_{10}H_{13}F_3IN$: C, 36.2; H, 4.0; F, 17.2; I, 38.4; N, 4.2.

FOUND: C, 36.5; H, 3.9; F, 16.9; I, 38.1; N, 4.0.

EXAMPLE II 5.68 gm of methyl iodide was gradually added to a solution of 0.73 gm of n-butylamine and 3.7 gm of tri-n-butylamine in 5 ml of N,N-dimethylformamide. After standing overnight, the addition of ether precipitated white solid crystals. The precipitate was removed by filtration, recrystallized from ethanol, washed with ether, and dried to give 2.25 gm (92 percent yield) of compound XX in Table I; mp 155°–156° C.

Anal. Calculated for $C_7H_{18}IN$: C, 34.6; H, 7.4; N, 5.8.

FOUND: C, 34.7; H, 7.6; N, 5.9.

EXAMPLE III

A solution of 500 mg of m-nitroaniline, 1.12 gm of 1,2,2,6,6-pentamethyl-piperidine, and 3.1 gm of methyl iodide in 5.0 ml of N,N-dimethylformamide was kept overnight at room temperature. The solid that formed was removed by filtration, washed with hot acetone, and dried to give 0.95 gm (86 percent yield) of compound IV in Table I as pale yellow crystals; mp 198°–199° C.

Anal. Calculated for $C_9H_{13}IN_2O_2$: C, 35.2; H, 4.2; I, 41.1; N, 9.1; O, 10.4.

FOUND: C, 35.4; H, 4.2; I, 41.5; N, 9.3; O, 10.2.

EXAMPLE IV

A solution of 500 mg of γ-aminobutyraldehyde diethylacetal and 0.96 gm of 1,2,2,6,6-pentamethylpiperidine in 10.0 ml of ethyl acetate was treated with 14.2 gm of methyl iodide. The 10 fold excess of methyl iodide aided in keeping all the quaternary product in solution. The reaction mixture was allowed to stand overnight at room temperature. The pentamethylpiperidine hydroiodide that precipitated was removed by filtration, and the filtrate evaporated under reduced pressure at ambient temperature to give a white solid which was washed with ether and dried to give 940 mg (90 percent yield) of compound XVI in Table I; mp 71°–72° C.

Anal. Calculated for $C_{11}H_{26}INO_2$: C, 40.0; H, 7.9; I, 38.5; N, 4.2.

FOUND: C, 39.9; H, 7.9; I, 39.5; N, 4.5.

EXAMPLE V

A solution of 500 mg of α-amino-γ-butyrolactone 38.5; and 1.5 gm of tri-n-butylamine in 10.0 ml of ethyl acetate was treated at ambient temperature with 2.5 gm of methyl iodide. A precipitate formed almost immediately. After three hours, the solid was removed by filtration and washed with ethyl acetate and then washed with ether. The product obtained was dissolved in methanol and passed through an analytical anion exchange resin column saturated with bromide ions. The eluent was concentrated to 15 ml and, upon addition of ether, a solid precipitated. The solid material was collected on a filter medium and vacuum dried at ambient temperature to give 320 mg (44 percent yield) of compound XIV in Table I; mp 210°–211° C.

Anal. Calculated for $C_7H_{15}BrNO_2$: C, 37.2; H, 6.7; Br, 35.6; N, 6.2.

FOUND: C, 37.6; H, 6.6; Br, 35.6; N, 6.4.

EXAMPLE VI 1.0 gm of 1-Amino-2-(4-aminophenyl)ethane, 4.53 gm of 1,2,2,6,6-pentamethyl-piperidine, and 11.5 gm of methyl iodide were dissolved in 10.0 ml of N,N-dimethylformamide. Heat evolved immediately, and a precipitate formed. After the fixture was kept at room temperature overnight, 250 ml of a 6 percent N,N-dimethyl-formamide in acetone solution were added and stirred for 20 minutes under reflux conditions. The remaining solid was collected on a filter medium and redissolved in methanol. Addition of ethyl acetate, filtration and drying produced 3.4 gm (97 percent yield) of compound XXVIII in Table II as white crystals; mp 260°–261° C.

Anal. Calculated for $C_{14}H_{26}I_2N_2$: C, 35.3; H, 5.5; I, 53.3; N, 5.9.

FOUND: C, 35.0; H, 5.8; I, 53.0; N, 5.7.

A summary of the reaction materials, products, and yields regarding Example I to VI above as well as quaternary compounds made by my process is shown in Tables I and II below. While the alkylating agent shown in Tables I and II is methyl iodide, any organic electrophilic material, such as an aliphatic or substituted aliphatic halide, sulfate, sulfonate, etc., which will combine with the amine to be alkylated can be used within the skill of the art. Also, any anion of the resulting quaternary ammonium product can be exchanged for any other anion by conventional ion exchange technique within the skill of the art as in Example V.

TABLE I.—MONOAMINES QUATERNIZED WITH METHYL IODIDE IN THE PRESENCE OF VARIOUS HINDERED ORGANIC BASES

| Amine | pKa | Solvent | Base | Quaternary compound | Yield, percent |
|---|---|---|---|---|---|
|  I | 2.36 | DMF[1] | 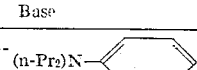 | 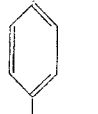 II | 84 |

TABLE I.—MONOAMINES QUATERNIZED WITH METHYL IODIDE IN THE PRESENCE OF VARIOUS HINDERED ORGANIC BASES — Continued

| Amine | pKa | Solvent | Base | Quaternary compound | Yield, percent |
|---|---|---|---|---|---|
| III (4-nitroaniline, NH₂-C₆H₄-NO₂) | 2.6 | DMF | (n-Pr)₂N-C₆H₅ | IV (⊖I ⊕N(CH₃)₃-C₆H₄-NO₂) | 98 |
| | | DMF | 2,2,6,6-tetramethylpiperidine (pentamethylpiperidine) | | 86 |
| | | DMF | (n-Bu)₃N | | 65 |
| V (4-trifluoromethylaniline) | Not determined | DMF | (n-Pr)₂N-C₆H₅ | VI (⊖I ⊕N(CH₃)₃-C₆H₄-CF₃) | 67 |
| VII (3-trifluoromethylaniline) | Not determined | DMF | (n-Pr)₂N-C₆H₅ | VIII (⊖I ⊕N(CH₃)₃-C₆H₄-CF₃) | 84 |
| | | | 2,6-lutidine (H₃C-pyridine-CH₃) | | 84 |
| IX (aniline, NH₂-C₆H₅) | 4.65 | DMF | N(Et)₂-C₆H₅ | X (⊖I ⊕N(CH₃)₃-C₆H₅) | 57 |
| XI (benzylamine, C₆H₅-CH₂NH₂) | 9.30 | DMF | N-methyldicyclohexylamine (CH₃-N(C₆H₁₁)₂) | XII (C₆H₅-CH₂N⊕(CH₃)₃ I⊖) | 85 |
| | | DMF | (n-Bu)₃N | | 64 |
| XIII (α-amino-γ-butyrolactone hydrobromide, NH₂·HBr) | Not determined | DMF | (n-Bu)₃N | XIV (Br⊖ ⊕N(CH₃)₃ lactone) | 43 |
| | | CH₃CN | (n-Bu)₃N | | |
| | | EtOAC | (n-Bu)₃N | | 44 |
| XV (H₂NCH₂CH₂CH(OEt)₂) | Not determined | EtOAC | PMP | XVI ((CH₃)₃⊕NCH₂CH₂CH(OEt)₂ I⊖) | 90 |
| XVII (cyclohexylamine) | 10.6 | DMF | (n-Bu)₃N | XVIII (I⊖ ⊕N(CH₃)₃-cyclohexyl) | 73 |
| XIX (n-BuNH₂) | 10.61 | DMF | (n-Bu)₃N | XX ((n-Bu)N⊕(CH₃)₃ I⊖) | 92 |

TABLE I.—MONOAMINES QUATERNIZED WITH METHYL IODIDE IN THE PRESENCE OF VARIOUS HINDERED ORGANIC BASES—Continued

| Amine | pKa | Solvent | Base | Quaternary compound | Yield, percent |
|---|---|---|---|---|---|
|  XXI | 11.05 | DMF | PMP | 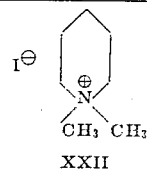 XXII | 78 |
| $(CH_3CH_2)_2NH$ XXIII | 11.11 | Acetone | PMP | $(CH_3CH_2)_2\overset{\oplus}{N}(CH_3)_2$ $I^{\ominus}$ XXIV | 90 |

1 DMF = N,N-dimethylformamide.
2 PMP = 1,2,2,6,6-pentamethylpiperidine.
3 XIV 43%—The $I^{\ominus}$ was exchanged to the $Br^{\ominus}$ by means of ion exchange resin.
4 Pr = Propyl.
5 Bu = Butyl.
6 Et = Ethyl.
7 EtOAC = Ethyl acetate.

TABLE II.—DIAMINES QUATERNIZED WITH METHYL IODIDE IN THE PRESENCE OF VARIOUS HINDERED ORGANIC BASES

| Diamine | pKa | Solvent | Base | Diquaternary compound | Yield, percent |
|---|---|---|---|---|---|
| 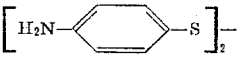 XXV | Not determined | DMF | PMP | 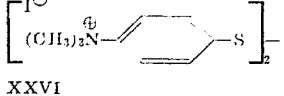 XXVI | 93 |
| 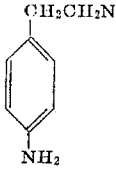 XXVII | Not determined | DMF | PMP | 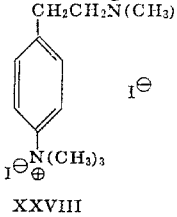 XXVIII | 97 |
| $H_2N-(CH_2)_3-NH_2$ XXIX | 10.54 | DMF / DMF | $(n-Bu)_3N$ / PMP | $I^{\ominus}\overset{\oplus}{(CH_3)_3N}-(CH_2)_3-\overset{\oplus}{N}(CH_3)_3 I^{\ominus}$ XXX | 51 / 57 |
| $H_2N-(CH_2)_4-NH_2$ XXXI | 10.71 | DMF / DMF | $(n-Bu)_3N$ / PMP | $I^{\ominus}\overset{\oplus}{(CH_3)_3N}-(CH_2)_4-\overset{\oplus}{N}(CH_3)_3 I^{\ominus}$ XXXII | 40 / 80 |
| $H_2N-(CH_2)_{10}-NH_2$ XXXIII | Not determined | DMF / $CH_3CN$ / DMF | $(n-Bu)_3N$ / $(n-Bu)_3N$ / PMP | $I^{\ominus}\overset{\oplus}{(CH_3)_3N}-(CH_2)_{10}-\overset{\oplus}{N}(CH_3)_3 I^{\ominus}$ XXXIV | 52 / 42 / 82 |

In accordance with my invention the alkylation process can be exhaustively carried out or terminated at any stage, such as the tertiary amine stage, by the selection of the appropriate stoichiochemical amounts. An example of such termination is as follows.

EXAMPLE VII

A solution of 5.0 gm of benzylamine, 15.3 gm of 1,2,-2,6,6-pentamethylpiperidine, and 11.0 gm of ethyl bromide in 15 ml of N,N-dimethylformamide was heated on a steam bath overnight. An aliquot portion is then withdrawn and analyzed by conventional means, such as gas-liquid chromatography. No primary amine was detected and the ratio of tertiary amine to secondary amine is approximately 99:1. The reaction mixture was diluted with 200 ml of ether and the pentamethylpiperidine hydrobromide which precipitates is collected on a filter medium to give 23.1 gm (100 percent yield) of the hydrobromide. The liquid portion is distilled by conventional technique to give analytically pure N,N-diethylbenzyl amine.

Anal. Calculated for $C_{11}H_{17}N$: C, 81.0; H, 10.4; N, 8.5. FOUND: C, 81.1; H, 10.7; N, 8.8.

It is noted that compounds XIV and XVI in Table I and compound XXVI in Table II are most difficult to prepare by conventional exhaustive alkylation starting with the corresponding primary amines.

It is obvious that other modifications can be made of my invention, and I desire to be limited only by the scope of the appended claims.

I claim:

1. A method for the synthesis of quaternary ammonium compounds as the final stage of alkylation from primary amines, secondary amines, and amine acid salts comprising the steps of preparing a reaction mixture of reactants, said reaction mixture consisting of an amine to be alkylated selected from the group consisting of primary amines, secondary amines, and amine acid salts, an alkylating agent and an organic base; reacting the reactants; and separating the product, said organic base being sterically hindered and of greater base strength than the amine to be alkylated.

2. The method of claim 1, wherein the organic base is selected from the group consisting of sterically hindered piperidines, sterically hindered pyridines, sterically hindered anilines and sterically hindered butylamines.

3. The method of claim 1 wherein the alkylating agent is an organic electrophilic material.

4. The method of claim 3 wherein the organic electrophilic material is a member selected from the group consisting of aliphatic halides, aliphatic sulfates, aliphatic sulfonates, substituted aliphatic halides, substituted aliphatic sulfates, and substituted aliphatic sulfonates.

5. The method of claim 1 wherein the reaction is carried out at room temperature.

6. The method of claim 1 wherein the separation is carried out by a means selected from the group consisting of distillation, centrifugation, chromatography, filtration, extraction, decantation, evaporation, separation by solubility differences, recrystallization, and any combination thereof.

7. The method of claim 1 wherein the reaction is terminated at a stage prior to the quaternary ammonium stage.

8. The method of claim 7 wherein the reaction is terminated at a tertiary amine stage.

9. The method of claim 1 wherein the reaction mixture is reacted in a solvent.

* * * * *